United States Patent Office 3,032,564
Patented May 1, 1962

3,032,564
9,11-DIHALOGENO A RING UNSATURATED STEROIDS OF THE ANDROSTENE SERIES
David H. Gould, Leonia, and Cecil H. Robinson, Clifton, N.J., assignors to Schering Corporation, Bloomfield, N.J., a corporation of New Jersey
No Drawing. Filed June 1, 1959, Ser. No. 817,071
23 Claims. (Cl. 260—397.3)

This invention pertains to novel halogenated steroids and in particular to 9α,11β-dihalogenated steroids of the androstene series which are therapeutically valuable. By the term androstene series, we mean androstanes having one or more double bonds in the A-ring such as the 3-keto-$\Delta^1$, 3-keto-$\Delta^4$, and 3-keto-$\Delta^{1,4}$-androstenes as well as 3-keto-$\Delta^4$-19-norandrostenes.

Our novel compounds may be represented by the following formula and include the 1,2-dihydro and the 1,2-dihydro-19-nor analogs thereof:

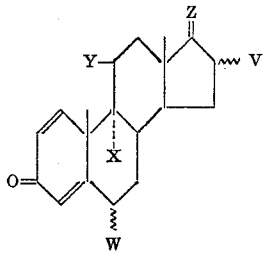

wherein Z is a member of the group consisting of O, (H, βOR), and (α-lower alkyl, βOR) wherein R is a member of the group consisting of hydrogen and lower alkanoyl; X and Y represent halogen; W is a member of the group consisting of H, F, and lower alkyl; and V is a member of the group consisting of hydrogen and lower alkyl.

In the above formula and throughout the instant application, a bond signified by a wavy line (∼) represents both the α and β-configuration of the bond so designated.

We have found that the presence of the 9,11-dihalogeno function in our novel steroids enhances the androgenic and/or anabolic activity over the corresponding unhalogenated compound. In addition, the ratio of androgenic to anabolic activity can be varied depending upon the particular combination of halogen at C-9 and C-11. Thus, there is observed with 9α,11β-dichloro-1,4-androstadiene-17β-ol-3-one 17-propionate a high level of both androgenic and anabolic properties while in the 9α-bromo-11β-fluoro analog of this compound, namely 9α-bromo-11β-fluoro-1,4-androstadiene-17β-ol-3-one 17-propionate there is a marked decrease in androgenic activity and an increase in anabolic activity as compared with the dichloro analog. The latter compound is accordingly useful for geriatric therapy, treatment of metabolic imbalances in juveniles, post surgical therapy, treatment of severe infection and dishabilitating diseases and in treatment of similar conditions where anabolism and constructive metabolism are desired without the androgenic activity usually associated with anabolic agents.

As stated above a halogen combination at C-9 and C-11 of the androstene nucleus, as for example dichloro, yields compounds which intensify androgenic activity without sacrificing anabolic activity and which are accordingly useful for treatment of severe hypogonadism, benign prostatic hypotrophy, dysmenorrhea, and other conditions where androgenic agents are indicated.

Our compounds are preferably administered orally in the form of tablets, capsules or the like. The dosage for adults may vary from 10 to 20 mg. while for children dosages from 0.5 mg. to the adult range may be employed depending upon the age of the child and the severity of the particular case.

The valuable therapeutic properties of anabolic and/or androgenic activity as described above are exhibited by both the 9,11-dihalogeno-$\Delta^4$-androstenes and the 9,11-dihalogeno-$\Delta^{1,4}$-androstadienes. In addition, the 9α,11β-dihalogeno-$\Delta^4$-androstenes may serve as valuable intermediates for the preparation of corresponding $\Delta^{1,4}$-dienes. This transformation may be effected by a chamical or microbiological dehydrogenation, as for example by subjecting the monoene to the action of the microorganism *Corynebacterium simplex* according to analogous procedures as described in U.S. Patent No. 2,837,464.

The preferred halogen combination for therapeutic use of our invention are the dichloro, bromo-fluoro, and bromo-chloro compounds. Exhibiting similar properties however and included within the scope of our invention are compounds such as 9α-chloro-11β-fluoro-1,4-androstadiene-3,17-dione;
9α-bromo-11β-chloro-1,4-androstadiene-17β-ol-3-one;
9α-bromo-11β-fluoro-17α-methyl-1,4-androstadiene-17β-ol-3-one;
9α-iodo-11β-chloro-4-androstene-3,17-dione;
9α,11β-dibromo-1,4-androstadiene-17β-ol-3-one;
9α,11β-dichloro-5-allo-1-androstene-3,17-dione;
9α-bromo-11β-chloro-5-allo-1-androstene-17β-ol-3-one;
9α-bromo-11β-fluoro-19-nor-4-androstene-3,17-dione;
6α-methyl-9α,11β-dichloro-1,4-androstadiene-3,17-dione;
6α-fluoro-9α,11β-dichloro-1,4-androstadiene-3,17-dione;
9α,11β-dichloro-4-androstene-3,17-dione;
9α-chloro-11β-fluoro-4-androstene-3,17-dione;
9α,11β-dichloro-1,4-androstadiene-3,17-dione;
9α,11β-dichloro-17α-methyl-1,4-androstadiene-17β-ol-3-one;
9α-bromo-11β-chloro-16α-methyl-1,4-androstadiene-17β-ol-3-one.

One preferred method for the preparation of the novel dihalogeno compounds of our invention is the oxidative degradation of the C-17 side chain of a 9α,11β-dihalogeno-pregnene. These 9α,11β-dihalo-pregnene intermediates, prepared according to the procedures as described in Patent No. 2,894,963 and in the copending application of Gould et al., and Serial No. 817,048 filed June 1, 1959, are oxidized with sodium bismuthate whereupon the side chain is cleaved resulting in the formation of a 17-keto group. Those 9α,11β-dihalogeno-pregnenes which have substituents other than hydrogen at C–6 will yield similarly substituted 9α,11β-dihalogeno-androstenes upon oxidation. Thus, there is obtained from 6α-methyl-9α-chloro-11β-fluoro-1,4-pregnadiene-17α,21-diol-3,20-dione upon oxidation with sodium bismuthate 6α-methyl-9α-chloro-11β-fluoro-1,4-androstadiene-3,17-dione.

Alternatively, the compounds of our invention are prepared according to the process described in copending application Serial No. 817,048, filed June 1, 1959, wherein a $\Delta^{9(11)}$-steroid possessing the $\Delta^1$-3-keto, $\Delta^4$-3-keto, or $\Delta^{1,4}$-3-keto system is selectively halogenated in the $\Delta^{9,11}$-position. Thus, for example, by employing said process there is obtained from 1,4,9(11)-androstatriene-3,17-dione upon treatment with N-chlorosuccinimide and lithium chloride in acetic acid, 9α,11β-dichloro-1,4-androstadiene-3,17-dione. In a similar fashion, there is obtained from 1,4,9(11)-androstatriene-3,17-dione upon treatment with hydrogen fluoride and N-bromoacetamide in diethylacetic acid, 9α-bromo-11β-fluoro-1,4-androstadiene-3,17-dione.

The keto group at C-17 may be reduced to β-hydroxyl either prior to or after halogenation by any of the known chemical or microbiological procedures such as for example, by refluxing with lithium aluminum tri-t-butoxyhydride in tetrahydrofuran or by submitting such 17-keto compound to the action of the microorganism *Saccharomyces cerevisiae* (A.T.C.C. 4125).

We have found that esterification of the C-17 hydroxy function results in prolongation of physiological action for our novel androstenes. The free hydroxy group at C-17 may be esterified by any of the known esterification methods. Thus, for example, treatment of 9α-bromo-11β-chloro-1,4-androstadiene-17β-ol-3-one with acetic anhydride in pyridine yields 9α-bromo-11β-chloro-1,4-androstadiene-17β-ol-3-one 17-acetate. Treatment with other lower alkyl acid anhydride such as propionic anhydride or butyric anhydride will similarly yield the corresponding esters.

A methyl substituent at C-6, C-16, or C-17 or a fluoro group at C-6 is preferably introduced prior to halogenation at C-9 and C-11. Thus, 17α-methyl-1,4,9(11)-androstatriene-17β-ol-3-one 17-propionate is treated with N-bromoacetamide and hydrogen fluoride and there is obtained 9α - bromo-11β-fluoro-17α-methyl - 1,4 - androstadiene - 17β - ol - 3 - one 17 - propionate. Similarly, a 6-methyl, 16-alkyl, or 6-fluoro androstene with unsaturation in the 9(11)-position is halogenated by the heretofore described methods to obtain the corresponding 6-methyl, 16-alkyl or 6-fluoro-9α-11β-dihalogeno-androstene.

It is apparent from the foregoing that there exist several alternative routes for the preparation of our novel dihalogenated androstenes. The following examples will serve to illustrate a number of these routes, but the examples should not be construed as limiting the scope of our invention, our invention being limited only by the appended claims.

EXAMPLE 1

*9α,11β-Dichloro-4-Androstene-3,17-Dione*

A. To a solution of 9α,11β-dichloro-4-pregnene-17α,21-diol-3,20-dione (1.0 g.) in 50% aqueous acetic acid (800 ml.) is added sodium bismuthate (18 g.) and the suspension is stirred at room temperature for 20 hours. The reaction mixture is then filtered and methylene chloride is added to the filtrate. Water is added to the resulting mixture and the organic phase is separated, washed with water, then with 10% aqueous sodium bicarbonate solution and finally with water. The methylene chloride solution is then dried with magnesium sulfate and evaporated in vacuo to give the crude product. Crystallization from methylene chloride-hexane gives 9α,11β-dichloro-4-androstene-3,17-dione.

B. The compound of this example is also prepared by halogenation of 4,9(11)-androstadiene-3,17-dione in the following manner. To a stirred solution of 4,9(11)-androstadiene-3,17-dione (1.0 g.) and lithium chloride (4.0 g.) in glacial acetic acid (40 ml.) at room temperature, is added a solution of chlorine (275 mg.) in tetrahydrofuran (3 ml.). Stirring is continued at room temperature for 17 hours and the reaction mixture is then poured into water (400 ml.) and filtered. The residue is washed with water, dried and crystallized from methylene chloride-hexane to yield 9α,11β-dichloro-4-androstene-3,17-dione.

EXAMPLE 2

*9α,11β-Dichloro-1,4-Androstadiene-3,17-Dione*

A. 9α,11β-dichloro-1,4-pregnadiene-17α,21-diol-3,20-dione is subjected to the sodium bismuthate oxidation according to Example 1A. There is obtained upon purification in the described manner, 9α,11β-dichloro-1,4-androstadiene-3,17-dione, M.P. 227–231° C. dec., [α]$_D$ 173° (dioxane)

$\lambda_{max.}^{MeOH}$ 235 mμ (15,600)

*Analysis.*—Calcd. for $C_{19}H_{22}O_2Cl_2$: C, 64.59; H, 6.28; Cl, 20.07. Found: C, 64.24; H, 6.58; Cl, 19.67.

B. Alternatively, by subjecting 9α,11β-dichloro-4-androstene-3,17-dione (the compound of Example 1) to the action of the microorganism *Corynebacterium simplex* as described below there is obtained the compound of this example.

A solution of 1 g. of yeast extract (Difco) in one liter of tap water, the pH of which is adjusted to 6.9, is distributed among ten 300 ml. Erlenmeyer flasks and to each flask is added a loopful, 2 ml., of *Corynebacterium simplex* (A.T.C.C. 6946). The resulting suspensions are incubated at 30° C. on a shaking machine for 18 hours. One-half gram of 9α,11β-dichloro-4-androstene-3,17-dione (the compound of Example 1) is dissolved in 25 ml. of acetone and the resulting solution is distributed equally among the ten flasks containing the 18-hour growth of *Corynebacterium simplex*. The culture containing the 9α,11β-dichloro-4-androstene-3,17-dione is then incubated at 30° C. for 24 hours. At the end of 24 hours, the contents of the flasks are combined and extracted with a total of 3 liters of chloroform. The crude chloroform extract from the transformation is then concentrated to a residue which is crystallized from methylene chloride-hexane, and recrystallized from the same solvent mixture to afford 9α,11β-dichloro-1,4-androstadiene-3,17-dione.

C. Alternatively, the compound of this example is prepared as follows. To a stirred solution of 1.32 g. of 1,4,9(11)-androstatriene-3,17-dione and 5.0 g. of lithium chloride in 60 ml. of diethylacetic acid at room temperature, is added 686 mg. of N-chlorosuccinimide followed at once by 5 ml. of N-aqueous hydrochloric acid. Stirring is continued at room temperature for 17 hours, and the reaction mixture is then poured into saturated aqueous sodium bicarbonate solution. The resulting mixture is extracted with methylene chloride and the extracts are washed with water, dried with magnesium sulfate and evaporated in vacuo to yield the crude product. Crystallization from acetone-hexane gives 9α,11β-dichloro-1,4-androstadiene-3,17-dione.

EXAMPLE 3

*9α,11β-Dichloro-1,4-Androstadiene-17β-ol-3-One*

A. One gram of 1,4,9(11)-androstatriene-17β-ol-3-one is allowed to react with chlorine (273 mg.) in glacial acetic acid (40 ml.) and lithium chloride (4 g.) in the manner of Example 1B, and there is obtained 9α,11β-dichloro-1,4-androstadiene-17β-ol-3-one.

B. Alternatively, the compound of this example is prepared as follows. The product of Example 2, 9α,11β-dichloro-1,4-androstadiene-3,17-dione (1.9 g.) and 6.0 g. of lithium aluminum tri-t-butoxyhydride in 50 ml. of tetrahydrofuran are heated at reflux for 20 hours. The mixture is then poured into 250 ml. of water and the precipitated solids are extracted with chloroform. The chloroform extracts are dried and concentrated to a small volume. The solution is diluted with hexane and placed on a magnesium silicate column. The column is eluted with ether and the ether eluates are evaporated to dryness. The residue so obtained is crystallized from methylene chloride-hexane yielding 9α,11β-dichloro-1,4-androstadiene-17β-ol-3-one.

EXAMPLE 4

*9α-Bromo-11β-Fluoro-1,4-Androstadiene-3,17-Dione*

A. 9α-bromo-11β-fluoro-1,4-pregnadiene - 17α,21-diol-3,20-dione is subjected to the oxidative procedure as described in Example 1A. Upon purification as therein described there is obtained 9α-bromo-11β-fluoro-1,4-androstadiene-3,17-dione, M.P. 194–196° C. dec. [α]$_D$ 118° (dioxane), max. 239 mμ (14,000).

*Analysis.*—Calcd. for $C_{19}H_{22}O_2BrF$: C, 59.84; H, 5.82; Br, 20.96; F, 4.98. Found: C, 60.00; H, 5.94; Br, 20.92; F, 4.32.

B. Alternatively, this compound is prepared as follows. To a stirred solution of 1.0 g. of 1,4,9(11)-androstatriene- 3,17-dione in 50 ml. of diethylacetic acid contained in a polyethylene bottle at room temperature is added a solution of 1.35 g. of hydrogen fluoride in 5 ml. of 1:2 chloroform-tetrahydrofuran solution followed by 535 mg. of N-bromoacetamide. Stirring is continued at room temperature for 17 hours, and the solution is then poured into 500 ml. of 10% aqueous sodium bicarbonate solution. The mixture is extracted with methylene chloride, and the extracts are washed with water, dried with magnesium sulfate and evaporated in vacuo to give 1.21 g. of the crude product (91%). Crystallization from acetone-hexane affords 9α - bromo - 11β-fluoro-1,4-androstadiene-3,17-dione, constants as above.

EXAMPLE 5

*9α,11β-Dibromo-1,4-Androstadiene-3,17-Dione*

A. 9α,11β-dibromo-1,4-pregnadiene-17α,21-diol - 3,20-dione is treated with sodium bismuthate according to the procedures of Example 1A. There is thus obtained the compound of this example, 9α,11β-dibromo-1,4-androstadiene-3,17-dione, $$\lambda_{max.}^{MeOH}\ 239\ m\mu\ (14{,}000)$$

B. Alternatively, this compound may be prepared from 1,4,9(11)-androstatriene-3,17-dione as follows. To a stirred solution of 1,4,9(11)-androstatriene-3,17-dione (1.0 g.) in glacial acetic acid (40 ml.) is added potassium bromide (6.0 g.) followed by N-bromoacetamide (535 mg.). Stirring is continued for two hours at room temperature, and the reaction mixture is then poured into water (400 ml.) and filtered. The wet solid is dissolved in methylene chloride and the solution is dried over magnesium sulfate and then concentrated to about 20 ml. Hexane is added and the solution is concentrated further until crystallization occurs. Filtration gives pure 9α-11β-dibromo-1,4-androstadiene-3,17-dione.

EXAMPLE 6

*9α-Bromo-11β-Chloro-1,4-Androstadiene-3,17-Dione*

A. Following the procedure of Example 1A, 9α-bromo-11β-chloro-1,4-pregnadiene-17α,21-diol-3,20-dione is oxidized to the compound of this example, 9α-bromo-11β-chloro-1,4-androstadiene-3,17-dione, $$\lambda_{max.}^{MeOH}\ 239\ m\mu$$

infrared absorption bands (Nujol) at 5.75μ (17-carbonyl) and 6.04, 6.15 and 6.22μ ($\Delta^{1,4}$-3-ketone).

B. Alternatively, the compound of this example is prepared as follows. To a stirred solution of 1,4,9(11)-androstatriene-3,17-dione (1.0 g.) and lithium chloride (5.0 g.) in glacial acetic acid (40 ml.) at room temperature is added N-bromoacetamide (535 mg.) and N-aqueous hydrochloric acid (5.0 ml.). Stirring is continued at room temperature for 3 hours, and the reaction mixture is then poured into water and filtered. The residue is washed with water and dried. Chromatography on silica gel, and elution with hexane-ether mixtures gives 9α - bromo-11β-chloro-1,4-androstadiene-3,17-dione, constants as above.

EXAMPLE 7

*9α-Chloro-11β-Fluoro-1,4-Androstadiene-3,17-Dione*

A. *9α - chloro - 11β - fluoro - 1,4-pregnadiene - 17α,21-diol-3,20-dione.*—Two grams of 9α-chloro-11β-fluoro-1,4-pregnadiene-17α,21-diol-3,20-dione 21-acetate in 100 ml. of a 3:1 methanol-chloroform mixture is chilled in ice and to it is added 52 ml. of 0.1 Normal sodium hydroxide solution. Stirring is continued at 5° for 10 minutes and the reaction mixture is then diluted with water and extracted with methylene chloride. The organic extract is washed with water and evaporated in vacuo to a residue which is crystallized from acetone-hexane to give 9α-chloro-11β-fluoro-1,4-pregnadiene-17α,21-diol-3,20-dione.

B. *9α-chloro-11β - fluoro - 1,4 - androstadiene -3,20-dione.*—9α-chloro-11β - fluoro - 1,4-pregnadiene-17α,21-diol-3,20-dione is subjected to the sodium bismuthate oxidation described in Example 1A. There is thus obtained 9α-chloro-11β-fluoro-1,4-androstadiene-3,17-dione.

C. Alternatively, the compound of this example is prepared as follows. 1.08 grams of 1,4,9(11)-androstatriene-3,17-dione in 50 ml. of diethylacetic acid is introduced into a polyethylene bottle at room temperature. To the solution is then added 1.35 g. of hydrogen fluoride in 5 ml. of a 1:2 chloroform-tetrahydrofuran solution followed by 540 mg. of N-chlorosuccinimide. The crude precipitate is chromatographed on silica gel and eluted with 50% hexane-ether. Crystallization from acetone of the solid so obtained yields 9α-chloro-11β-fluoro-1,4-androstadiene-3,17-dione.

EXAMPLE 8

*9α,11β-Difluoro-1,4-Androstadiene-3,17-Dione*

9α-11β-difluoro - 1,4 - pregnadiene - 17α,21-diol-3,20-dione, the requisite intermediate for this example, is prepared according to the procedure of the copending application of Gould and Reimann, Serial No. 817,048, filed June 1, 1959.

9α,11β - difluoro - 1,4 - pregnadiene - 17,21 - diol-3,20-dione is subjected to the oxidative procedure of Example 1A and, there is thus obtained the compound of this example, 9α,11β - difluoro-1,4-androstadiene-3,17-dione.

EXAMPLE 9

*9α-Fluoro-11β-Chloro-1,4-Androstadiene-3,17-Dione*

9α - fluoro - 11β - chloro - 1,4 - pregnadiene - 17α,21-diol-3,20-dione is treated with sodium bismuthate according to the procedure of Example 1A. There is thus obtained the compound of this example, 9α-fluoro-11β-chloro-1,4-androstadiene-3,17-dione.

EXAMPLE 10

*9α-Iodo-11β-Fluoro-1,4-Androstadiene-3,17-Dione*

To a stirred solution of 1,4,9(11)-androstatriene-3,17-dione (1.0 g.) in diethylacetic acid (50 ml.) contained in a polyethylene bottle at room temperature is added a solution of hydrogen fluoride (1.35 g.) in chloroform-tetrahydrofuran (1:2; 5 ml.) followed by N-iodosuccinimide (880 mg.). Stirring is continued at room temperature for 17 hours, and the solution is then poured into 10% aqueous sodium bicarbonate solution (500 ml.). The mixture is extracted with methylene chloride, and the combined extracts are washed with dilute sodium thiosulfate solution, water, and dried with magnesium sulfate. Evaporation in vacuo gives the product of 9α-iodo-11β-fluoro-1,4-androstadiene-3,17-dione.

EXAMPLE 11

*9α-Iodo-11β-Chloro-1,4-Androstadiene-3,17-Dione*

To a stirred solution of 1,4,9(11)-androstatriene-3,17-dione (1.0 g.) and lithium chloride (5.0 g.) in glacial acetic acid at room temperature is added N-iodosuccinimide (880 mg.) and an anhydrous solution of hydrogen chloride (140 mg.) in tetrahydrofuran (1.4 ml.). The reaction mixture is stirred at room temperature for 3 hours and is then poured into water (400 ml.) and extracted with methylene chloride. The organic phase is separated and washed with 10% aqueous sodium bicarbonate solution, then with dilute sodium thiosulfate solution, and finally with water. The solution is then dried with magnesium sulfate and evaporated in vacuo to yield 9α-iodo-11β-chloro-1,4-androstadiene-3,17-dione.

Alternatively, the compound of this example is prepared by saponifying 9α-iodo-11β-chloro-1,4-pregnadiene-17α,21-diol-3,20-dione 21-acetate according to the procedure of Example 7A and subjecting the 9α-iodo-11β-chloro-1,4-pregnadiene - 17α,21 - diol-3,20-dione thus obtained to the procedure of Example 1A. There is thus obtained 9α-iodo - 11β - chloro - 1,4 - androstadiene-3,17-dione.

EXAMPLE 12

6α-Fluoro-9α,11β-Dichloro-1,4-Androstadiene-3,17-Dione

A. *6α-fluoro - 1,4,9(11) - androstatriene-3,17-dione.*—Five grams of 6α-fluoro-1,4,9(11)-pregnatriene-17α,21-diol-3,20-dione are allowed to react with sodium bismuthate (90 g.) in the manner of Example 1A to furnish 6α-fluoro-1,4,9(11)-androstatriene-3,17-dione after crystallization of the crude product from methylene chloride-hexane.

B. *6α - fluoro-9α,11β-dichloro-1,4-androstadiene-3,17-dione.*—One gram of the compound obtained in Example 12A is allowed to react with 261 mg. of chlorine according to the procedure of Example 1B. There is thus obtained 6α - fluoro-9α,11β-dichloro-1,4-androstadiene-3,17-dione.

EXAMPLE 13

6α-Fluoro-9α-Bromo-11β-Chloro-1,4-Androstadiene-3,17-Dione

One gram of the compound obtained in Example 12A is subjected to the procedure of Example 6B, using the corresponding equivalent amount of N-bromoacetamide. There is thus obtained 6α-fluoro-9α-bromo-11β-chloro-1,4-androstadiene-3,17-dione.

EXAMPLE 14

9α,11β-Dichloro-6α-Methyl-1,4-Androstadiene-3,17-Dione

A. *6α-methyl-1,4,9(11)-androstatriene - 3,17 - dione.*—A solution of five grams of 6α-methyl-1,4,9(11)-pregnatriene-17α,21-diol-3,20-dione 21-acetate in methanol-chloroform (3:1; 200 ml.) is cooled to 5° and then is treated with 0.1 N sodium hydroxide solution (53.9 ml.) dropwise with stirring. Stirring is continued at 5° C. for 10 minutes and the reaction mixture is then diluted with water and extracted with methylene chloride. The organic extract is washed with water and evaporated in vacuo to give the crude product. Crystallization from acetone-hexane affords 6α-methyl-1,4,9(11)-pregnatriene-17α,21-diol-3,20-dione. This compound is then degraded with sodium bismuthate in the manner of Example 1A to yield 6α-methyl-1,4,9(11)-androstatriene-3,17-dione.

B. *9α,11β - dichloro - 6α - methyl-1,4-androstadiene-3,17-dione.*—One gram of 6α-methyl-1,4,9(11)-androstatriene-3,17-dione, from Example 14A, is allowed to react with N-chlorosuccinimide (490 mg.) in the manner of Example 2C to give 9α,11β-dichloro-6α-methyl-1,4-androstadiene-3,17-dione.

EXAMPLE 15

9α-Chloro-11β-Fluoro-6α-Methyl-1,4-Androstadiene-3,17-Dione

The compound prepared in Example 14A, 6α-methyl-1,4,9(11)-androstatriene-3,17-dione is subjected to the procedure of Example 7C. There is thus obtained upon purification as therein described the compound of this example, 9α-chloro-11β-fluoro-6α-methyl-1,4-androstadiene-3,17-dione.

EXAMPLE 16

19-Nor-4,9(11)-Androstadiene-3,17-Dione

To a stirred solution of 2.0 g. of 19-nor-4-androstene-11β-ol-3,17-dione in 20 ml. of dimethylformamide and 2 ml. of pyridine which has been cooled to 0° C. is added 1.60 g. of methane sulfonyl chloride. Stirring is continued at room temperature for 24 hours and the reaction mixture then diluted with water and extracted with methylene chloride. The extract is washed with water and dried over magnesium sulfate. Evaporation of the methylene chloride, in vacuo, yields the crude product which is chromatographed on magnesium silicate to yield 19-nor-4,9(11)-androstadiene-3,17-dione.

EXAMPLE 17

9α,11β-Dichloro-19-Nor-4-Androstene-3,17-Dione

A stirred solution of 1.0 g. of 19-nor-4,9(11)-androstadiene-3,17-dione (from Example 16) in 40 ml. of carbon tetrachloride and 0.8 ml. of pyridine is chilled to −20° C. Three hundred mg. of chlorine in 3.0 ml. of carbon tetrachloride is added and stirring continued for 15 minutes at −20° C. The mixture is allowed to cool to room temperature and then further diluted with 50 ml. of methylene chloride. The resulting solution is washed successively with sodium thiosulfate solution, water, 10% sodium bicarbonate solution and finally with water; then dried with magnesium sulfate and evaporated in vacuo to yield the crude product. Crystallization from acetone-hexane affords 9α,11β-dichloro-19-nor-4-androstene-3,17-dione.

EXAMPLE 18

9α-Bromo-11β-Chloro-19-Nor-4-Androstene-3,17-Dione

One gram of the 19-norandrostadiene prepared in Example 16 is dissolved in 50 ml. of carbon tetrachloride and .85 ml. of pyridine. The solution is cooled to −20° C. and 500 mg. of N-bromoacetamide added followed by 148 mg. of hydrogen chloride in 1.48 ml. of tetrahydrofuran. Stirring is continued at −20° C. for 15 minutes, and the reaction mixture allowed to attain room temperature over a 15 minute period. Sixty ml. of methylene chloride is then added to the reaction mixture and the resultant mixture washed successively with sodium thiosulfate solution, water, 10% sodium bicarbonate solution and finally with water. The solution is then dried over magnesium sulfate and evaporated to a residue which upon recrystallization from methylene chloride-pentane affords 9α-bromo - 11β - chloro-19-nor-4-androstene-3,17-dione.

EXAMPLE 19

6β-Methyl-19-Nor-4,9(11)-Androstadiene-3,17-Dione

A. *6β-methyl-19-norandrostane - 5α,11β-diol-3,17-dione 3,17-bis-ethylene ketal.*—A solution of 4 g. of 5α,6α-epoxy-19-norandrostane-11β-ol-3,17-dione 3,17-bis-ethylene ketal in tetrahydrofuran (200 ml.) is added to 50 ml. of a stirred solution of 4 molar methyl magnesium bromide in ether, under nitrogen. The mixture is then distilled until the vapor temperature raches 60° C., and is then refluxed for 20 hours. The reaction mixture is then allowed to cool to room temperature, 200 ml. of benzene is added, dropwise with stirring, and the liquid phase is separated. The residue is washed twice with 100 ml. portions of benzene, and the combined extracts are washed with water, then with 10% ammonium chloride solution and finally again with water, dried with magnesium sulfate and evaporated in vacuo. The crude residue thereby obtained is crystallized from acetone and hexane to give 6β-methyl-19-norandrostane-5α,11β-diol-3,17 - dione 3,17-bis-ethylene ketal.

B. *6β-methyl-19 - norandrostane-5α,11β-diol - 3,17-dione.*—2.5 grams of the product from Example 16A are dissolved in glacial acetic acid (60 ml.) and water (20 ml.) and the resulting solution is heated on the steam bath for 45 minutes. The reaction mixture is then poured into a mixture of ice and water, and sodium bicarbonate (45 g.) is added portionwise with stirring. The mixture is filtered and the residue is washed with water and dried, to give a residue of 6β-methyl-19-norandrostane-5α,11β-diol-3,17-dione, which is used without further purification in the following procedure.

C. *6β-methyl-19 - nor - 4-androstene-11β-ol-3,17-dione.*—The compound obtained in Example 19B, 6β-methyl-19-norandrostane-5α,11β-diol-3,17-dione (2.1 g.), is dissolved in methanol (200 ml.) and N/10 aqueous sodium hydroxide (40 ml.) and the solution is refluxed for one hour. The solution is then cooled, neutralized with acetic acid and evaporated in vacuo until crystallization ensues. The mixture is then chilled, filtered, and the residue is washed with water and dried giving crystalline 6β-methyl-19-nor-4-androstene-11β-ol-3,17-dione.

D. *6β-methyl-19-nor-4,9(11) - androstadiene - 3,17-dione.*—One gram of the product of Example 19C is dehydrated with methanesulfonyl chloride (800 mg.) in dimethylformamide (10 ml.) and pyridine (1.0 ml.) in the manner of Example 10 to give 6β-methyl-19-nor-4,9 (11)-androstadiene-3,17-dione.

EXAMPLE 20

*9α,11β-Dichloro-6β-Methyl-19-Nor-4-Androstene-3,17-Dione*

500 mg. of 6β-methyl-19-nor-4,9(11)-androstadiene-3,17-dione (prepared according to the procedure of Example 19) are allowed to react with chlorine (296 mg.) in the manner of Example 1B to give 9α,11β-dichloro-6β-methyl-19-nor-4-androstene-3,17-dione.

EXAMPLE 21

*9α-Chloro-11β-Fluoro-1,4-Androstadiene-17β-Ol-3-One*

A. *1,4,9(11)-androstatriene-17β-ol-3-one.*—To a solution of 200 g. of sucrose in 1.5 liters of tap water, contained in a 2-liter Fernbach flask, is added 500 mg. of 1,4,9(11)-androstatriene-3,17-dione, the compound of Example 2. The resulting suspension is autoclaved at 15 lbs. pressure and at 120° C. for 45 minutes. To the cooled solution is then added 100 ml. of ethanol and 100 g. of baker's yeast. The pH of the reaction mixture is adjusted to 4.5-5.0 by the addition of dilute sulfuric acid, the yeast cell mass is dispersed, and mechanical agitation, sufficiently slow to maintain anerobic conditions, is commenced.

This agitation is continued for 48 hours, and during the first 12 hours the pH of the medium is adjusted hourly to 4.5-5.0 by addition of dilute ammonium hydroxide. Subsequently pH determinations and adjustments are made every 8 hours. At the end of the reaction period the mixture is centrifuged for one hour, and the supernatant liquid is separated and the remaining cell mass extracted by refluxing for ½ hour with two 1-liter portions of methanol. The combined methanolic extracts and supernatant liquid are concentrated in vacuo to about 200 ml. and 400 ml. of water is added. The resulting aqueous solution is then extracted three times with methylene chloride, and the combined methylene chloride extracts are dried with magnesium sulfate and evaporated in vacuo. The resulting crude residue is extracted three times with boiling diethyl ether, and the combined ethereal extracts are passed through a column of magnesium silicate. The eluates are evaporated and the residue is crystallized from acetone-hexane to give 1,4,9(11)-androstatriene-17β-ol-3-one.

B. *9α - chloro-11β-fluoro-1,4 - androstadiene-17β-ol-3-one.*—The compound prepared in Example 21A, 1,4,9(11)-androstatriene-17β-ol-3-one, is subjected to the reaction sequence described in Example 7A. There is thus obtained the compound of this example, 9α-chloro-11β-fluoro-1,4-androstadiene-17β-ol-3-one.

EXAMPLE 22

*9α-Bromo-11β-Chloro-1,4-Androstadiene-17β-Ol-3-One*

1,4,9(11)-androstatriene-17β-ol-3-one is subjected to the procedure of Example 6B. There is thus obtained 9α-bromo-11β-chloro-1,4-androstadiene-17β-ol-3-one.

Alternatively, the reduction procedure of Example 3B will yield the compound of this example from 9α-bromo-11β-chloro-1,4-androstadiene-3,17-dione.

EXAMPLE 23

*9α,11β-Dichloro-6β-Methyl-19-Nor-4-Androstene-17β-Ol-3-One*

6β-methyl-19-nor-4,9(11)-androstadiene-3,17 - dione is treated according to Example 3B. The product thereby obtained, 6β-methyl-19-nor-4,9(11)-androstadiene-17β-ol-3-one is treated according to the procedure of Example 3A. There is thus obtained 9α,11β-dichloro-6β-methyl-19-nor-4-androstene-17β-ol-3-one.

EXAMPLE 24

The compound of Example 21A, 1,4,9(11)-androstatriene-17β-ol-3-one is subjected to the reaction procedure of Example 4B. There is thus obtained 9α-bromo-11β-fluoro-1,4-androstadiene-17β-ol-3-one.

EXAMPLE 25

*9α,11β-Dichloro-17α-Methyl-4-Androstene-17β-Ol-3-One*

A solution of 1 g. of 17α-methyl-4,9(11)-androstadiene-17β-ol-3-one in 40 ml. of glacial acetic acid is treated with 261 mg. of chlorine and 4.0 g. of lithium chloride in the manner of Example 1B. There is thus obtained 9α,11β-dichloro-17α-methyl-4-androstene-17β-ol-3-one.

EXAMPLE 26

*9α-Bromo-11β-Fluoro-17α-Methyl-4-Androstene-17β-Ol-3-One*

A solution of 1 g. of 17α-methyl-4,9(11)-androstadiene-17β-ol-3-one in diethylacetic acid is treated with 503 mg. of N-bromoacetamide and 1.27 g. of hydrogen fluoride in the manner of the alternative procedure of Example 4B. There is thus obtained 9α-bromo-11β-fluoro-17α-methyl-4-androstene-17β-ol-3-one.

EXAMPLE 27

*9α-Bromo-11β-Fluoro-17α-Methyl-4-Androstene-17β-Ol-3-One 17-Propionate*

One gram of 17α-methyl-4,9(11)-androstadiene-17β-ol-3-one 17-propionate is allowed to react with 423 mg. of N-bromoacetamide and 1.07 g. of hydrogen fluoride in the manner of Example 4B. There is thus obtained 9α-bromo-11β-fluoro-17α-methyl - 4-androstene-17β-ol-3-one 17-propionate.

Alternatively, this compound is prepared by treating 1 gram of the product of Example 26 with propionic anhydride under an atmosphere of nitrogen. The solution is refluxed until esterification is complete and the solution then poured into water and stirred for 3 hours until the excess propionic anhydride is hydrolyzed. The mixture is then extracted with ether and the ethereal solution washed with 5% sodium bicarbonate and then water, and then dried over magnesium sulfate. The ether is evaporated to a residue comprising 9α-bromo-11β-fluoro-17α-methyl-4-androstene-17β-ol-3-one 17-propionate.

EXAMPLE 28

*9α,11β-Dichloro-17α-Methyl-1,4-Androstadiene-17β-Ol-3-One*

The compound obtained in Example 25 is subjected to the action of the microorganism *Corynebacterium simplex* in the manner of Example 2B and there is thus obtained upon purification as therein described, 9α,11β-dichloro-17α-methyl-1,4-androstadiene-17β-ol-3-one.

Alternatively, the compound of this example may be prepared as follows. 17α-methyl-4,9(11)-androstadiene-17β-ol-3-one is subjected to the action of the microorganism *Corynebacterium simplex* according to the procedures described in U.S. Patent No. 2,837,464 yielding 17α-methyl-1,4,9(11)-androstatriene-17β-ol-3-one which is treated with chlorine and lithium chloride in the manner of Example 1B, obtaining upon purification as therein described, 9α,11β-dichloro-17α-methyl-1,4-androstadiene-17β-ol-3-one.

EXAMPLE 29

*6α-Fluoro-9α,11β-Dichloro-17α-Methyl-1,4-Androstadiene-17β-Ol-3-One*

6α-fluoro-17α-methyl-4,9(11) - androstadiene-17β-ol-3- one is subjected to the action of *Corynebacterium simplex* as described in Example 2A. There is thus obtained 6α-fluoro-17α-methyl-1,4,9(11) - androstatriene-17β-ol-3-one which upon treatment with chlorine and lithium chloride in the manner of Example 1B yields 6α-fluoro-9α,11β-dichloro-17α-methyl-1,4-androstadiene-17β-ol-3-one.

EXAMPLE 30

*9α,11β-Dichloro-6α,17α-Dimethyl-1,4-Androstadiene-17β-Ol-3-One*

6α,17α-dimethyl-4,9(11)-androstadiene-17β-ol-3-one is subjected to the reaction sequence described in Example 29 and the resultant product purified in the described manner to yield 9α,11β-dichloro-6α,17α-dimethyl-1,4-androstadiene-17β-ol-3-one.

EXAMPLE 31

*Preparation of 17-Esters: 9α,11β-Dichloro-1,4-Androstadiene-17β-Ol-3-One-17-Acetate*

A. To a solution of 100 mg. of 9α,11β-dichloro-1,4-androstadiene-17β-ol-3-one (the compound of Example 3) in 0.5 ml. of pyridine is added 0.5 ml. of acetic anhydride. The reaction mixture is allowed to stand overnight at room temperature. Water is then added and the resulting precipitate removed by filtration. Recrystallization is effected from acetone-hexane affording 9α,11β-dichloro-1,4-androstadiene-17β-ol-3-one-17 acetate.

In analogous fashion, the 17-acetates of 9α-bromo-11β-chloro - 1,4 - androstadiene-17β-ol-3-one, 9α-chloro-11β-fluoro-1,4-androstadiene - 17β - ol-3-one, 9α,11β-dichloro-6β-methyl-19-nor-4-androstene-17β-ol-3-one, and 9α,11β-dichloro - 16β-methyl-1,4-androstadiene-17β-ol-3-one are prepared by this procedure.

This procedure is not limited to the preparation of acetates but is equally applicable for propionates, butyrates, cyclopentylpropionates, caproates and the like. Thus, for example, by substituting propionic anhydride in the above procedure, there is obtained 9α,11β-dichloro-1,4-androstadiene-17β-ol-3-one 17-propionate.

B. Alternatively, lower alkanoic acid esters are prepared as follows. 1,4,9(11)-androstadiene-3,17-dione is reduced according to the procedure of Example 21A and there is thus obtained upon purification 1,4,9(11)-androstatriene-17β-ol-3-one.

To a solution of 1 g. of 1,4,9(11)-androstatriene-17β-ol-3-one in 20 ml. of pyridine at room temperature is added 5 ml. of propionic anhydride and the reaction mixture is allowed to stand for 17 hours at room temperature. The reaction mixture is then poured into crushed ice and the resulting mixture is allowed to attain room temperature, then filtered. The residue is washed with water, dried and crystallized from acetone-hexane to give 1,4,9(11) - androstatriene - 17β-ol-3-one 17-propionate, M.P. 137–138° C., [α] —12° (dioxane), $$\lambda_{max.}^{MeOH}\ 238\ m\mu\ (15,400)$$

*Analysis.*—Calcd. for $C_{22}H_{18}O_3$: C, 77.61; H, 8.29. Found: C, 77.94; H, 8.46.

To a stirred solution of 1 g. of 1,4,9(11)-androstatriene-17β-ol-3-one 17-propionate and 40 g. of lithium chloride in 30 ml. of glacial acetic acid at room temperature is added 429 mg. of N-chlorosuccinimide followed immediately by 3.1 ml. of N-aqueous hydrochloric acid. Stirring is continued at room temperature for 3½ hours, and the reaction mixture is then poured into 300 ml. of cold water and extracted 3 times with methylene chloride. The combined extracts are washed with 5% aqueous sodium bicarbonate solution, then with water, and then dried with magnesium sulfate. Evaporation in vacuo yields a residue which is chromatographed on magnesium silicate. Elution with ether-hexane (3:1) affords 9α,11β-dichloro - 1,4-androstadiene-17β-ol-3-one 17-propionate which crystallizes from ether-pentane, M.P. 170–173° C., [α]D +105° (dioxane), $$\lambda_{max.}^{MeOH}\ 237\ m\mu\ (15,200)$$

Similarly, by allowing 1,4,9(11)-androstatriene-17β-ol-3-one to react with other hydrocarbon acid anhydrides such as acetic anhydride and caproic anhydride, the corresponding 17-acylates of 1,4,9(11)-androstatriene-17β-ol-3-one are produced. These 17-acylates may then be halogenated with analogous procedures to those described above.

EXAMPLE 32

*9α,11β-Dichloro-16α-Methyl-1,4-Androstadiene-3,17-Dione*

One gram of 9α,11β-dichloro-16α-methyl-1,4-pregnadiene-17α,21-diol-3,20-dione is subjected to the oxidative degradation of Example 1A and there is thus obtained upon purification as therein described the compound of this example, 9α,11β-dichloro-16α-methyl-1,4-androstadiene-3,17-dione.

In a similar fashion, 9α,11β-dichloro-16β-methyl-1,4-pregnadiene-17α,21-diol-3,20-dione is converted to the corresponding androstadiene compound, 9α,11β-dichloro-16β-methyl-1,4-androstadiene-3,17-dione.

EXAMPLE 33

*9α-Bromo-11β-Chloro-16α-Ethyl-1,4-Androstadiene-3,17-Dione*

One gram of 9α-bromo-11β-chloro-16α-ethyl-1,4-pregnadiene-17α,21-diol-3,20-dione in 800 ml. of 50% acetic acid is subjected to the action of sodium bismuthate as described in Example 1A, and purified as therein described to yield the compound of this example, 9α-bromo-11β-chloro-16α-ethyl-1,4-androstadiene-3,17-dione.

We claim:

1. Compounds of the group consisting of steroids having the formula:

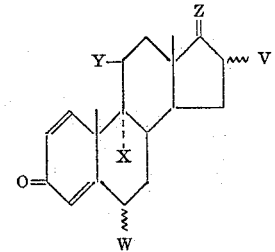

the 1,2-dihydro analogs and 1,2-dihydro-19-nor analogs thereof, wherein X and Y represent halogen; W is a member of the group consisting of hydrogen, fluorine and methyl; and Z is a member of the group consisting of O, (αH, βOR), and (αCH₃, βOR) wherein R is selected from the group consisting of hydrogen and lower alkanoyl; and V is selected from the group consisting of hydrogen and lower alkyl.

2. 9α-X-11β-Y-1,4-androstadiene-3,17-dione wherein X and Y are halogen.
3. 9α-X-11β-Y-4-androstene-3,17-dione wherein X and Y are halogen.
4. 9α-X-11β-Y-1,4-androstadiene-17β-ol-3-one wherein X and Y are halogen.
5. 9α-X-11β-Y-4-androstene-17β-ol-3-one wherein X and Y are halogen.
6. 9α-X-11β-Y-17α-lower alkyl-1,4-androstadiene-17β-ol-3-one wherein X and Y are halogen.
7. 9α-X-11β-Y-17α-lower alkyl-4-androstene-17β-ol-3-one wherein X and Y are halogen.
8. 9α,11β-dichloro-4-androstene-3,17-dione.
9. 9α,11β-dichloro-1,4-androstadiene-3,17-dione.
10. 9α,11β-dichloro-1,4-androstadiene-17β-ol-3-one.
11. 9α-bromo-11β-chloro-1,4-androstadiene-3,17-dione.
12. 9α-chloro-11β-fluoro-1,4-androstadiene-3,17-dione.

13. 9α-chloro-11β-fluoro-1,4 - androstadiene - 17β-ol-3-one.

14. 9α-bromo-11β-chloro-1,4-androstadiene - 17β-ol-3-one.

15. 9α-bromo-11β-fluoro-1,4-androstadiene - 17β-ol-3-one.

16. 9α,11β-dichloro-17α-methyl-4-androstene-17β-ol-3-one.

17. 9α-bromo-11β-fluoro-17α-methyl-4-androstene-17β-ol-3-one.

18. 9α - bromo - 11β - fluoro - 17α - methyl - 4 - androstene-17β-ol-3-one 17-propionate.

19. 9α,11β-dichloro-17α-methyl-1,4-androstadiene-17β-ol-3-one.

20. 6α - fluoro - 9α,11β - dichloro - 17α - methyl - 1,4-androstadiene-17β-ol-3-one.

21. 9α,11β - dichloro - 6α,17α - dimethyl - 1,4 - androstadiene-17β-ol-3-one.

22. 9α,11β-dichloro-16α-methyl-1,4-androstadiene-3,17-dione.

23. 9α,11β-dichloro-16β-methyl-1,4-androstadiene-3,17-dione.

References Cited in the file of this patent

Robinson et al.: J.A.C.S., vol. 81 (May 5, 1959), pages 2191–2195.